(12) United States Patent
Makino et al.

(10) Patent No.: US 6,534,430 B2
(45) Date of Patent: Mar. 18, 2003

(54) MATERIAL FOR MEASURING STATIC AND DYNAMIC PHYSICAL PARAMETERS

(75) Inventors: Hiroaki Makino, Aichi (JP); Mitsuru Asai, Aichi (JP); Nobuo Kamiya, Aichi (JP); Shin Tajima, Aichi (JP); Katsunori Yamada, Aichi (JP); Hiroshi Hohjo, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/793,444

(22) Filed: Feb. 27, 2001

(65) Prior Publication Data

US 2001/0020694 A1 Sep. 13, 2001

(30) Foreign Application Priority Data

Feb. 28, 2000 (JP) ........................................ 2000/051120

(51) Int. Cl.$^7$ ................................................. G01B 7/16
(52) U.S. Cl. ...................... 501/152; 501/95.2; 501/95.3; 501/97.3; 501/97.4; 501/103; 501/104; 501/108; 501/118; 501/120; 501/121; 501/135; 501/138; 501/139
(58) Field of Search .................... 501/95.2, 95.3, 501/97.4, 97.3, 103, 104, 108, 118, 120, 121, 135, 138, 139, 152

(56) References Cited

U.S. PATENT DOCUMENTS 5,132,583 A * 7/1992 Chang ................... 252/62.9 R
5,510,304 A * 4/1996 Willkens ................... 501/97.4
5,854,157 A * 12/1998 Hwang et al. ............... 428/404
5,985,183 A * 11/1999 Hori et al. ............. 252/519.13

FOREIGN PATENT DOCUMENTS

JP 52-040793 3/1977
JP 04-053206 2/1992

* cited by examiner

Primary Examiner—C. Melissa Koslow
(74) Attorney, Agent, or Firm—Oblon, Spivak, McClelland, Maier & Neustadt, P.C.

(57) ABSTRACT

A sensor material for measuring physical parameters capable of configuring a sensor capable of directly measuring a high value of physical parameters such as high stress or high pressure without employing a pressure resistance container. The sensor material for measuring static and dynamic physical parameters includes a matrix made of an electrically insulating ceramic material, and piezoresistance materials which are dispersed in the matrix so as to be electrically continuous to each other.

23 Claims, 8 Drawing Sheets

MATERIAL FOR MEASURING STATIC AND DYNAMIC PHYSICAL PARAMETERS

CROSS-REFERENCES TO RELATED APPLICATIONS

The present application claims priority under 35 U.S.C. §119 to Japanese Patent Application No. 2000-051120, filed Feb. 28, 2000, entitled "MATERIAL FOR MEASURING STATIC AND DYNAMIC PHYSICAL PARAMETERS". The contents of this application are incorporated herein by reference in their entirety.

BACKGROUND OF THE INVENTION

1. Field of the Invention

The present invention relates to a material used as a sensor that configures a sensor for measuring a static and dynamic physical parameter such as force, pressure, torque, speed, acceleration, position, displacement, impact force, weight and mass, degree of vacuum, rotational force, vibration or noise.

2. Related Arts

Conventionally, there has been known a semiconductor silicon single crystal and silicon carbide or the like as a constituent material for a sensor that can measure a static and dynamic physical parameter such as force, pressure, torque, speed, acceleration, position, displacement, impact force, weight and mass, degree of vacuum, rotational force, vibration or noise, via a distortion (stress), that is, a material having a piezoresistance.

In addition, as a piezoresistance material, there is also known $La_{1-x}Sr_xMnO_3$ or the like that is a pervskite type composite oxide.

The piezoresistance used here denotes a phenomenon in which, when a compression stress, a tensile stress, a shear stress, or static hydraulic stress are applied to a material, an electrical resistance of a material changes.

However, a conventional material is low in mechanical strength, and thus, has been hardly used as a constituent element of a sensor used for measurement under a high pressure and a high load. Therefore, a material for measuring physical parameters made of such a conventional material has been subjected to measurement under a high pressure and a high load by putting it in a proper pressure resistance container.

Thus, there has been a problem with a complicated sensor construction and higher cost.

SUMMARY OF THE INVENTION

It is an object of the present invention to provide a sensor material for measuring physical parameters capable of configuring a sensor capable of directly measuring a high value of physical parameters such as high stress or high pressure without employing a pressure resistance container.

According to one aspect of the invention, the sensor material for measuring static and dynamic physical parameters includes a matrix made of an electrically insulating ceramic material, and piezoresistance materials which are dispersed in the matrix so as to be electrically continuous to each other.

BRIEF DESCRIPTION OF THE DRAWINGS

A complete appreciation of the invention and many of the attendant advantages thereof will become readily apparent with reference to the following detailed description, particularly when considered in conjunction with the accompanying drawings, in which.

DESCRIPTION OF THE PREFERRED EMBODIMENTS

Figure 1:
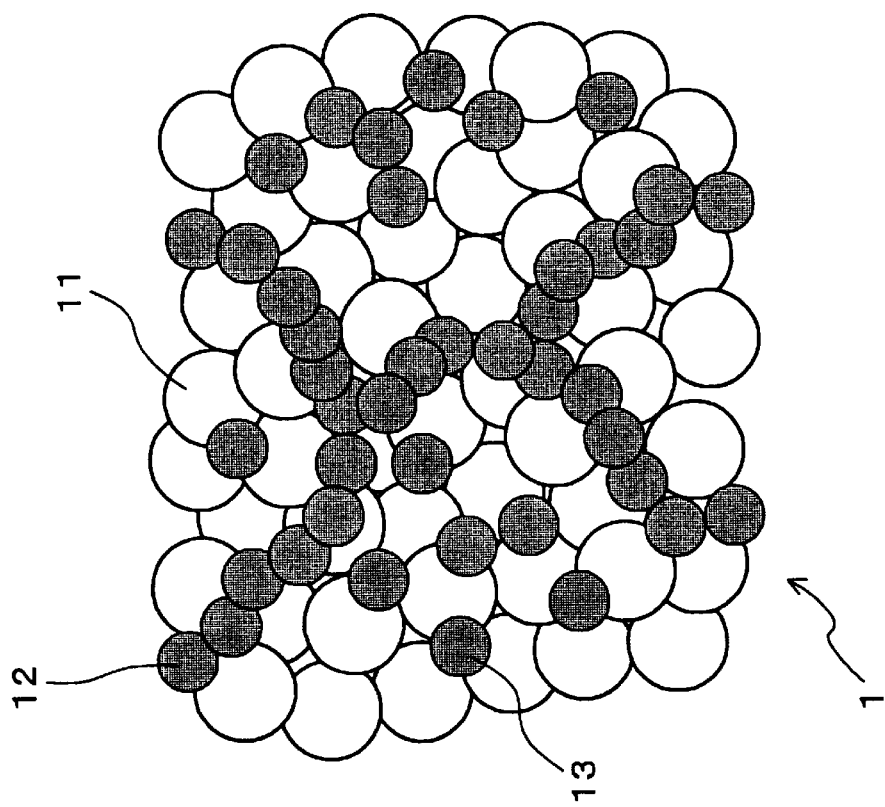
FIG. 1 is an illustrative view illustrating a configuration of a material for measuring physical parameters according to a first embodiment.

The preferred embodiments will now be described with reference to the accompanying drawings, wherein like reference numerals designate corresponding or identical elements throughout the various drawings.

A material for measuring physical parameters according to the present invention disperses a piezoresistance material for providing a piezoresistance in a material with its excellent strength including a ceramic material.

The ceramic material used here denotes a substance made of one or more kinds selected from, for example, $ZrO_2$, $Al_2O_3$, $MgAl_2O_4$, $SiO_2$, $3Al_2O_3.2SiO_2$, $Y_2O_3$, $CeO_2$, $La_2O_3$, $Si_3N_4$ and a solid solution thereof.

In addition, as described later, the piezoresistance material includes one or more kinds of substances such as $(Ln_{1-x}Ma_x)_{1-y}MbO_{3-z}$ with a perovskite structure (where, $0<x\leq0.5$, $0\leq y\leq0.2$, $0\leq z\leq0.6$, Ln: lanthanoide element, Ma: one or more kinds of alkaline earth elements, Mb: one or more kinds of transition-metal elements), $(Ln_{2-u}Ma_{1+u})_{1-v}Mb_2O_{7-w}$ with a layered perovskite structure (where, $0<u\leq1.0$, $0\leq v\leq0.2$, $0\leq w\leq1.0$, Ln: rare earth element, Ma: one or more kinds of alkaline earth element, Mb: one or more kinds of transition-metal elements) and Si.

In addition, this piezoresistance material can take a variety of particle forms such as spherical shape, elliptical shape, or fiber shape.

The above described matrix ceramic material is responsible for a strength of the material for measuring physical parameters against a high load or a high pressure, and thus, a material for measuring physical parameters with its high strength can be obtained.

In addition, as shown in FIG. 1, in a material for measuring physical parameters 1 according to the present invention, a piezoresistance material 12 is dispersed continuously between the above described ceramic materials 11. Thus, each piezoresistance material 12 is also in an electrically continuous state (Namely, an electrically conductive path is formed).

Therefore, as in a conventional material for measuring physical parameters composed of only a general piezoresistance material, a pressure or load is applied to the material according to the present invention, thereby making it possible to have characteristics that an electrical resistivity changes. Hence, the material for measuring physical parameters according to the present invention functions as a piezoresistance material, and has high strength.

Therefore, a sensor made of the material according to the present invention bears a high stress or a high pressure of 100 MPa or more, for example, in its original state without being put in a pressure resistance container or the like, and can perform measurement of a static and dynamic physical parameter.

In this way, the material according to the present invention can configure a sensor system without requiring a pressure resistance container or the like. Hence, this material is optimal in construction of a compact sensor or sensor system with its simple structure.

In addition, an additional construction is not required in particular, and thus, the manufacturing cost or equipment cost of the sensor or sensor system can be reduced.

The sensor made of the material according to the present invention includes a sensor or sensor system for measuring a static and dynamic physical parameters such as force, pressure, torque, speed, acceleration, position, displacement, impact force, weight and mass, degree of vacuum, rotational force, vibration, or noise.

In particular, the material according to the present invention is optimal as a material that configures a sensor to be assembled in variety of transport machines, machine tools or the like, because it is required for them to measure a dynamic physical parameter such under a high load or a high pressure.

The above piezoresistance material preferably has a piezoresistance at a certain temperature within the temperature range of at least −50 to 200° C. (degree Celsius).

In this manner, a sensor material having a piezoresistance in the vicinity of room temperature can be obtained.

The pressure resistivity variation rate of the piezoresistance material is preferably 0.001%/MPa or more.

In this manner, a sensor material with its high sensitivity can be obtained.

In the case where the above pressure resistivity variation rate is less than 0.001%/MPa, there is apprehension that a sufficient sensor output cannot be obtained.

The pressure resistivity variation rate used here denotes a variation rate of an electrical resistivity when a compressive stress, a tensile stress, a shear stress, or a static hydraulic stress is applied.

The relative density of the above sensor material is preferably 90% or more.

In this manner, a sensor material with high strength can be obtained, and there can be obtained a material for a sensor capable of bearing a high load or a high pressure without employing a pressure resistance container or the like, which has been difficult in a conventional material.

In the case where the relative density is less than 90%, there is a possibility that non-linear deformation occurs with a sensor material itself due to a loading. Thus, there is apprehension that precise value of a physical parameter cannot be measured.

The resistivity of the sensor material is preferably 0.1 $\Omega$cm (ohm centimeter) to 10 k$\Omega$cm (kilo-ohm centimeter).

In this manner, there can be obtained an element having its proper electrical resistance when an actual sensor element is configured.

In the case where the above resistivity is less than 0.1 $\Omega$cm, when a sensor element is configured, the resistance of an element is too low to obtain sufficient sensor output. Thus, there is apprehension that a physical parameter is hardly measured. On the other hand, in the case where the resistivity exceeds 10 k$\Omega$cm, there is apprehension that the resistance of an actual element is too high.

The bending strength of the above electrically insulating ceramic material is preferably 200 MPa or more.

In this manner, a sensor material having its high strength close to that of a ceramic material can be obtained, and a material for a sensor capable of sensing a high load or a high pressure without a pressure resistance container or the like can be configured.

In the case where the above bending strength is less than 200 MPa, a sufficient strength cannot be imparted to a sensor material. Thus, there is apprehension that an advantageous effect of the present invention is hardly obtained.

The above piezoresistance material is preferably made of at least one member selected from the group consisting of $(Ln_{1-x}Ma_x)_{1-y}MbO_{3-z}$ with a perovskite structure (where, $0<x\leq0.5$, $0\leq y\leq0.2$, $0\leq z\leq0.6$, Ln: rare earth element, Ma: one or more kinds of alkaline earth element, Mb: at least one transition-metal elements), $(Ln_{2-u}Ma_{1+u})_{1-v}Mb_2O_{7-w}$ with a layered perovskite structure (where, $0<u\leq1.0$, $0\leq v\leq0.2$, $0\leq w\leq1.0$, Ln: rare earth element, Ma: at least one alkaline earth element, Mb: at least one transition-metal elements) and Si.

These piezoresistance materials have high pressure resistivity variation rate. Therefore, a sensor material having high sensitivity can be configured.

In addition, the above piezoresistance material may contain another element in the constituted substance having a perovskite structure or layered structure, or Si.

In the $(Ln_{1-x}Ma_x)_{1-y}MbO_{3-z}$, in the case where "x" is 0 or exceeds 0.5, there is apprehension that a piezoresistance is not obtained or even if such effect is obtained, this is not a piezoresistance having a sufficient value.

In the $(Ln_{1-x}Ma_x)_{1-y}MbO_{3-z}$, "y" denotes a loss quantity of A site with a perovskite structure. In case of $0\leq y\leq0.2$, the piezoresistance material within the range of the constitution can obtain a piezoresistance suitable to configure a sensor material.

In the case where "y" exceeds 0.2, there is apprehension that the piezoresistance is reduced, and a sensor material cannot be configured.

In the $(Ln_{1-x}Ma_x)_{1-y}MbO_{3-z}$, even if an oxygen loss quantity "z" is not less than 0 and not more than 0.6, a proper piezoresistance is obtained, and a sensor material can be configured. In the case where "z" exceeds 0.6, there is apprehension that a piezoresistance is not obtained or even if such effect is obtained, this is not a piezoresistance having a sufficient value.

In addition, in the $(Ln_{2-u}Ma_{1+u})_{1-v}Mb_2O_{7-w}$, in the case where "u" is 0 or exceeds 1.0, there is apprehension that a piezoresistance is not obtained or if the effect is obtained, this is not a piezoresistance of a sufficient valve.

In the $(Ln_{2-u}Ma_{1+u})_{1-v}Mb_2O_{7-w}$, in case of $0 \leq v \leq 0.2$, the piezoresistance material within the range of the above constitution can obtain a piezoresistance suitable to configure a sensor material.

In the case where "v" exceeds 0.2, there is apprehension that a piezoresistance is not obtained or even if such effect is obtained, this is not a piezoresistance having a sufficient value.

In the $(Ln_{2-u}Ma_{1+u})_{1-v}Mb_2O_{7-w}$, even if an oxygen loss quantity "w" is not less than 0 and not more than 1.0, a proper piezoresistance is obtained, and a sensor material can be configured.

In the case where "w" exceeds 1.0, there is apprehension that a piezoresistance is not obtained or even if such effect is obtained, this is not a piezoresistance having a sufficient value.

The above electrically insulating ceramic material is preferably made of at least one member selected from the group consisting of $ZrO_2$, $Al_2O_3$, $MgAl_2O_4$, $SiO_2$, $3Al_2O_3 \cdot 2SiO_2$, $Y_2O_3$, $CeO_2$, $La_2O_3$, $Si_3N_4$ and solid solution thereof.

These ceramic material have high compressive strength, thus a sensor material with high strength can be obtained. Therefore a sensor which is capable of sensing high load or a high pressure without a pressure resistance container or the like can be configured.

The amount of the piezoresistance material is preferably 5 to 95% by weight relevant to a total weight of a sensor material.

In this manner, a sensor material having its proper electrical resistance, strength, and pressure resistivity variation rate can be obtained.

In the case where the above volume fraction is less than 5% by weight, an electrically conductive path is not formed. Thus, there is apprehension that it cannot be used as a sensor material. On the other hand, in the case where the volume fraction is more than 95% by weight, there is apprehension that a material strength becomes low, and an advantageous effect of the present invention cannot be obtained.

The above electrically insulating ceramic material is preferably $ZrO_2$ or $ZrO_2$ having $CeO_2$, $Y_2O_3$, $CaO$ or $MgO$ added thereto. In addition, the above piezoresistance material is preferably composed of $Ln_{1-x}Ma_xMbO_{3-z}$ with a perovskite structure (where, $0<x \leq 0.5$, $0 \leq z \leq 0.6$, Ln: rare earth element, Ma: at least one alkaline earth element, Mb: at least one transition-metal element).

In the $Ln_{1-x}Ma_xMbO_{3-z}$, in the case where "x" is 0 or exceeds 0.5, there is apprehension that a piezoresistance is not obtained or even if such effect is obtained, this is not a piezoresistance of a sufficient value.

In the $Ln_{1-x}Ma_xMbO_{3-z}$, even if an oxygen loss quantity "z" is not less than 0 and not more than 0.6, a proper piezoresistance is obtained, and a sensor material can be configured. In the case where "z" exceeds 0.6, there is apprehension that a piezoresistance is not obtained or even if such effect is obtained, this is not a piezoresistance of a sufficient value.

A sensor material made of such electrically insulating ceramic material and piezoresistance material has a proper strength and a pressure resistivity variation rate, which are suitable for a material for a sensor used for a high load in particular.

The above electrically insulating ceramic material is preferably $ZrO_2$ or $ZrO_2$ with $CeO_2$, $Y_2O_3$, $CaO$ or $MgO$ added thereto. In addition, the above piezoresistance material is preferably made of $(Ln_{1-x}Ma_x)_{1-y}MbO_{3-z}$ with a perovskite structure (where, $0<x \leq 0.5$, $0 \leq y \leq 0.2$, $0 \leq z \leq 0.6$, Ln: rare earth element, Ma: at least one alkaline earth element, Mb: at least one transition-metal element).

In the $(Ln_{1-x}Ma_x)_{1-y}MbO_{3-z}$, in the case where "x" is 0 or exceeds 0.5, there is apprehension that a piezoresistance is not obtained or even if such effect is obtained, this is not a piezoresistance of a sufficient value.

In the $(Ln_{1-x}Ma_x)_{1-y}MbO_{3-z}$, in case of $0 \leq y \leq 0.2$, the piezoresistance material within the above constitution range can obtain a piezoresistance suitable to configure a sensor material.

In the case where "y" is 0 or exceeds 0.2, there is apprehension that a piezoresistance is reduced, and a sensor material cannot be configured.

In the $(Ln_{1-x}Ma_x)_{1-y}MbO_{3-z}$, when an oxygen loss quantity "z" is not less than 0 and not more than 0.6, a proper piezoresistance is obtained, and a sensor material can be configured. In the case where "z" exceeds 0.6, there is apprehension that a piezoresistance is not obtained or even if such effect is obtained, this is not a piezoresistance of a sufficient value.

A sensor material made of such electrically insulating ceramic material and piezoresistance material has a proper strength and pressure resistivity variation rate, which are suitable for a material for a sensor used for a high load in particular.

The above electrically insulating ceramic material is preferably made of $Si_3N_4$, and the above piezoresistance material is preferably made of Si.

A sensor material made of such electrically insulating ceramic material and piezoresistance material has a proper strength and pressure resistivity variation rate, which are suitable for a material for a sensor used for a high load in particular.

The above electrically insulating ceramic material is preferably made of $Al_2O_3$. The above piezoresistance material is preferably made of $(Ln_{1-x}Ma_x)_{1-y}MbO_{3-z}$ with a perovskite structure (where, $0<x \leq 0.5$, $0 \leq y \leq 0.2$, $0 \leq z \leq 0.6$, Ln: rare earth element, Ma: at least one alkaline earth element, Mb: at least one transition-metal element).

In the $(Ln_{1-x}Ma_x)_{1-y}MbO_{3-z}$, in the case where "x" is 0 or exceeds 0.5, there is apprehension that a piezoresistance is not obtained or even if such effect is obtained, this is not a piezoresistance of a sufficient value.

In the $(Ln_{1-x}Ma_x)_{1-y}MbO_{3-z}$, in case of $0 \leq y \leq 0.2$, the piezoresistance material within the range of constitution can obtain a piezoresistance suitable to configure a sensor material.

In the case where "y" exceeds 0.2, there is apprehension that the piezoresistance is reduced, and a sensor material cannot be configured.

In the $(Ln_{1-x}Ma_x)_{1-y}MbO_{3-z}$, even if an oxygen loss quantity "z" is not less than 0 and not more than 0.6, a proper piezoresistance is obtained, and a sensor material can be configured. In the case where "z" exceeds 0.6, there is apprehension that a piezoresistance is not obtained or even if such effect is obtained, this is not a piezoresistance of a sufficient value.

A sensor material made of such electrically insulating ceramic material and piezoresistance material has a proper strength and pressure resistivity variation rate which are suitable for a material for a sensor used for a high load in particular.

(First Embodiment)

A sensor material according to the first embodiment of the present invention will be described with reference to FIG. 1 to FIG. 6.

The sensor material 1 according to the embodiment includes a matrix made of an electrically insulating ceramic material 11, and piezoresistance materials 12 which are dispersed in the matrix so as to be electrically continuous to each other, as shown in FIG. 1.

As shown in the figures, some piezoresistance materials 13 exist as being insular in the ceramic material 11 without being electrically continuous.

Now, a detailed description will be given below.

With respect to a sensor material of the embodiment, an electrically insulating ceramic material is made of $ZrO_2$ having 12 mol % $CeO_2$, and the piezoresistance material is made of $La_{0.8}Sr_{0.2}MnO_3$.

First, a manufacturing method will be described here.

$La_2O_3$ powders, $SrCO_3$ powders, and $MnCO_3$ powders were balanced to be 0.8:0.2:1 in concentration of La:Sr:Mn. These powders were charged in a polyethylene pot with mixture $ZrO_2$ ball and mixture solvent ethanol, and were mixed for 20 hours.

The mixed powders were dried, milled, and temporarily burned in atmosphere at 1300° C. for 4 hours, and perovskite type complex oxide powders $La_{0.8}Sr_{0.2}MnO_3$ having piezoresistance were synthesized.

Subsequently, commercially available $ZrO_2$ powders (OZC-12CEB available from Sumitomo Osaka Cement Co., Ltd.) and synthesized $La_{0.8}Sr_{0.2}MnO_3$ powders were balanced to be 28% by weight at a weight rate of $La_{0.8}Sr_{0.2}MnO_3$ relevant to a total weight.

These powders were charged in a polyethylene pot together with a mixture $ZrO_2$ ball and mixture solvent ethanol, were mixed for 4 hours, and further dried and milled. The milled mixture powders were press molded to be formed in a cylindrical shape of 18 mm in diameter×7 mm in height. The molder was sintered at 1250° C. for 4 hours.

The obtained sintered body was made in density to be 98% of theoretical density, was conductive, and was about 100 Ωcm in resistivity.

The performance of the obtained sensor material was evaluated.

Figure 2:
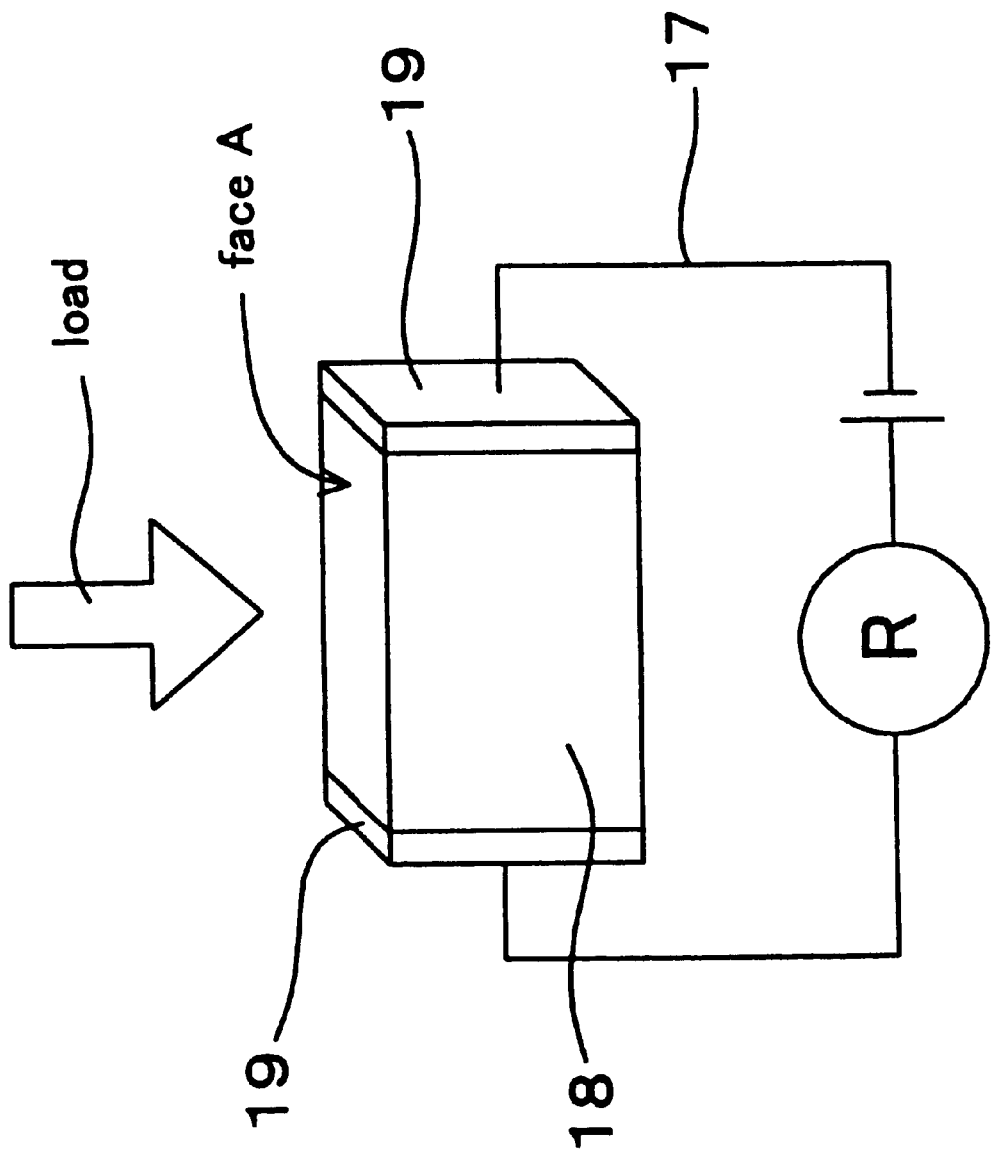
FIG. 2 is an illustrative view illustrating a method for measuring a resistivity variation rate of the material for measuring physical parameters according to the first embodiment.

As shown in FIG. 2, the above sintered body was processed to form a sample piece 18 in its cubic shape of 4 mm×4 mm×4 mm. Then, an Ag paste (S8740 available from Sumitomo Metal Milling Co., Ltd.) was burned at 550° C. at the opposite side face of a sample piece, and an electrode 19 was obtained. Further, a lead wire 17 was soldered at an electrode 19.

Figure 3:
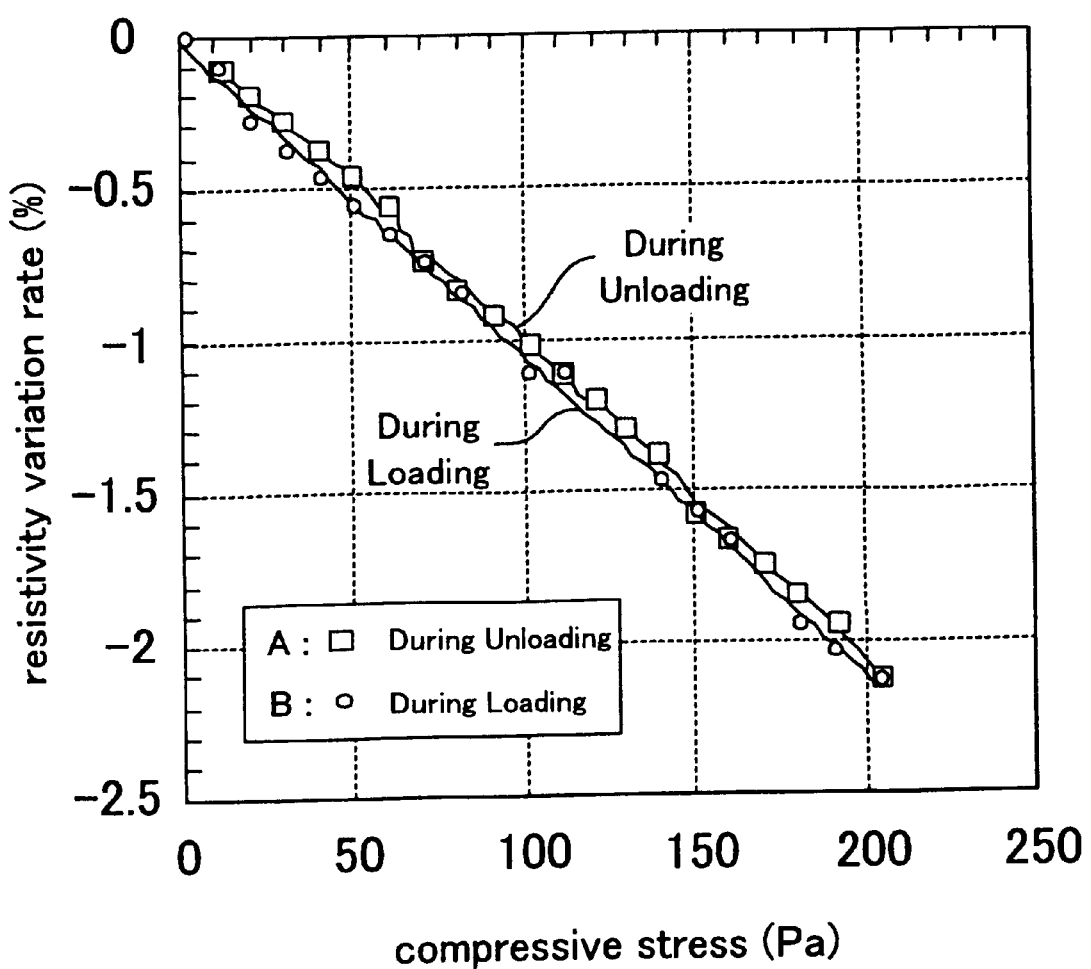
FIG. 3 is a diagram showing a relationship between a resistivity variation rate, i.e. piezoresistance, and a compressive stress during loading and unloading according to the first embodiment.

A load up to 400 kg was applied to face A vertical to the electrode 19 as indicated by the arrow shown in the figure, and a voltage was applied through a lead wire 17 and the electrode 19. Then, an electrical resistance was measured by using a 2-terminal technique. Based on the measurement result, a relationship between a load and an electrical resistivity variation rate was plotted as shown in FIG. 3. With respect of the above measurement, the result obtained when a load is gradually increased ("A" in the figure, a line described as "During Loading") and the result obtained when a load is gradually decreased ("B" in the figure, line described as "During Unloading") were described respectively.

From FIG. 3, it was found that the electrical resistance is lowered by about 2.1% at a compressive stress of 200 MPa, and the variation is substantially linear relevant to a load.

Figure 5:
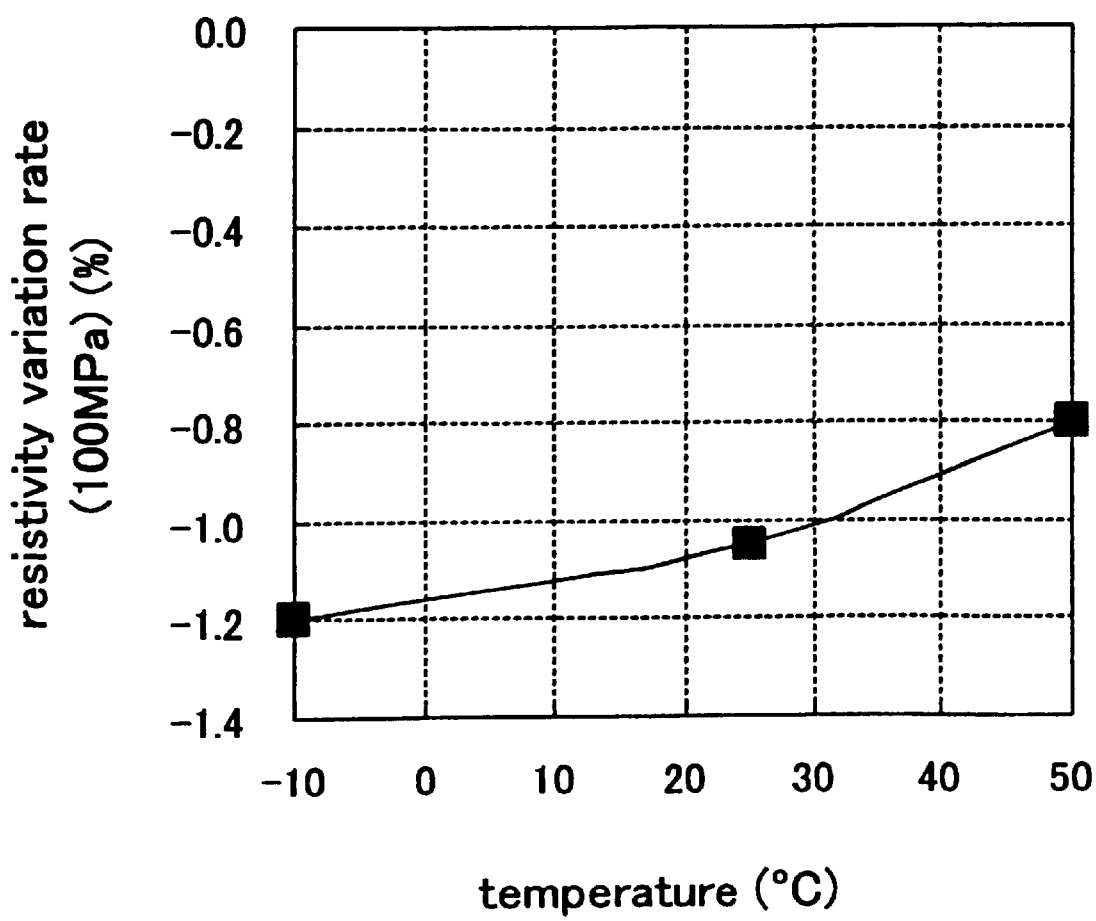
FIG. 5 is a diagram showing a relationship between a resistivity variation rate and a temperature when a load of 100 MPa is applied, according to the first embodiment.

Next, a relationship between the resistivity variation rate of the test piece and the measurement temperature under a compressive stress of 100 MPa was described in FIG. 5.

Although the resistivity variation rate is varied by a temperature, it was found that the variation rate in the range of −10 to 50° C. is about −1%.

Hence, it was found that the material according to the illustrative embodiment can be employed as a material for a pressure or load sensor used in the temperature range from −10 to 50° C.

In addition, from the result shown in FIG. 3, a sensor fabricated by a sensor material according to the embodiment is not broken even if a compressive stress of 200 MPa is applied. Thus, for example, it was found that this sensor is suitable for a pressure or load sensor used for a high load used for a transport machine or machine tool and the like.

Figure 4:
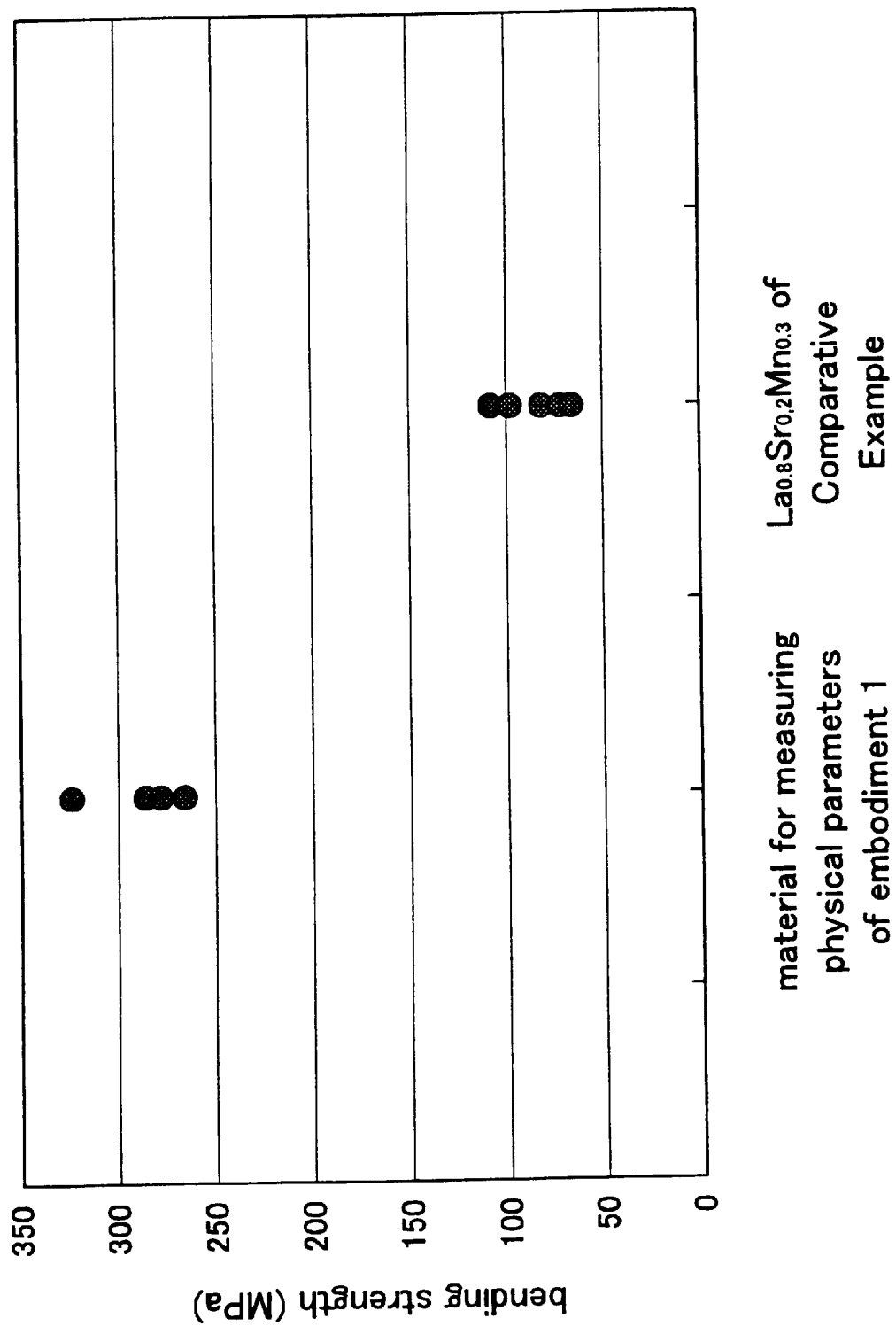
FIG. 4 is a diagram showing a bending strength between the material for measuring physical parameters according to Examples and that according to Comparative Examples in the first embodiment.

In FIG. 4, the bending strength of the sensor material according to the embodiment and $La_{0.8}Sr_{0.2}MnO_3$ according to Comparative Examples were measured and described. As is evident from the figure, the sensor material of the embodiment has higher strength than $La_{0.8}Sr_{0.2}MnO_3$ in a single phase, and the sensor material of the embodiment is suitable for a sensor material used for a high load.

The sensor material of the illustrative embodiment is a material wherein a material 12 for providing a piezoresistance is dispersed in a ceramic material 11 which has excellent strength, as shown in FIG. 1.

The ceramic material 11 is responsible for the strength of the sensor material 1 relevant to a high load, high pressure and the like, and thus, a material with high strength can be obtained.

In addition, piezoresistance materials 12 exist so as to be continuous inside of the ceramic material 11, and thus, each piezoresistance material 12 is in electrically continuous state. Thus, the sensor material 1 of the embodiment can have characteristics that, as the conventional sensor material composed of only a piezoresistance material do, a pressure or load is applied, whereby the electrical resistance value changes. Hence, the material according to the present invention functions as a piezoresistance material, and has high strength.

As described above, according to the present invention, there can be provided a sensor material capable of configuring a sensor capable of directly measuring a high value of physical parameters such as high stress or high pressure without employing a pressure resistance container or the like.

A sensor or sensor system can be configured without requiring a pressure resistance container or the like, and thus, the sensor material according to the embodiment is optimal in construction of a compact sensor or sensor system with its simple structure.

In particular, an additional construction is not required, and thus, manufacturing cost and equipment cost can be reduced.

(Second Embodiment)

Figure 6:
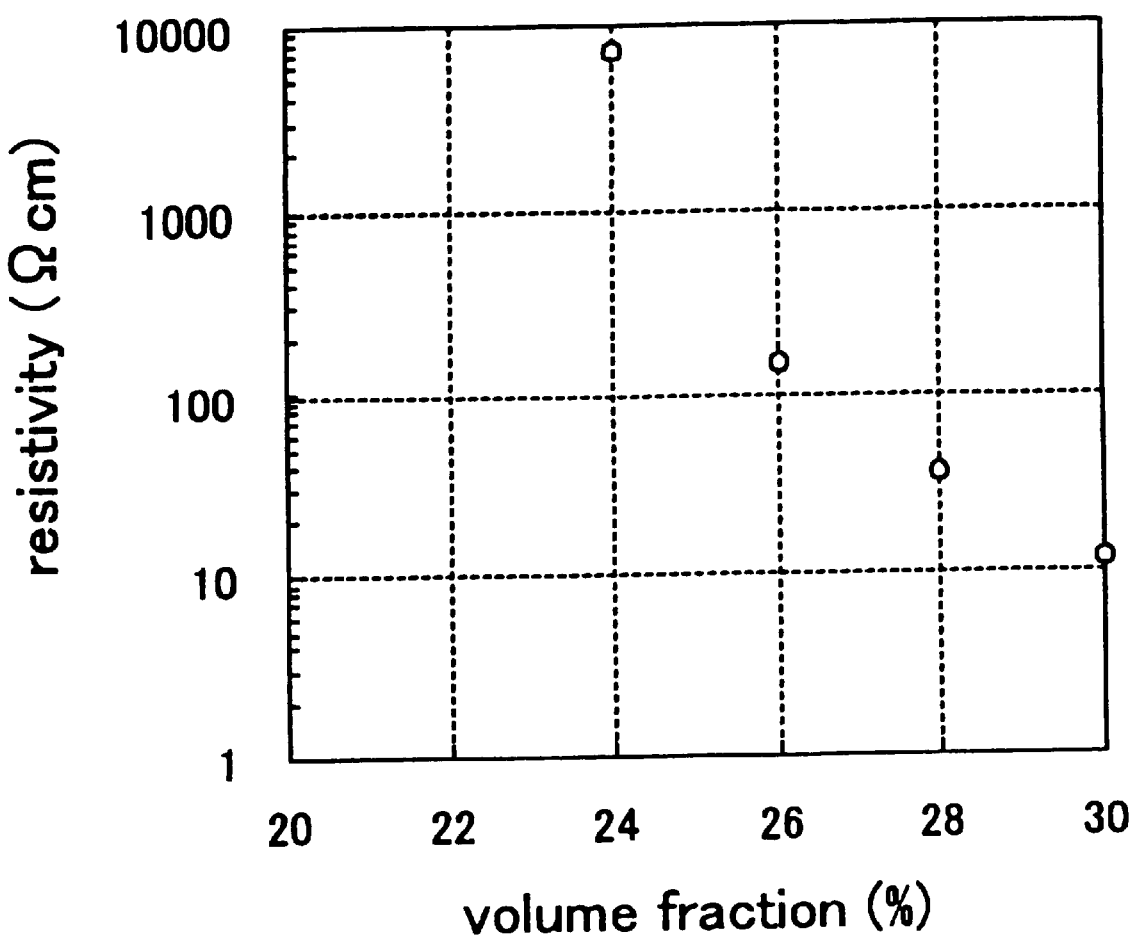
FIG. 6 is a diagram showing a relationship between a volume fraction of a piezoresistance material and a resistivity according to a second embodiment.
Figure 7:
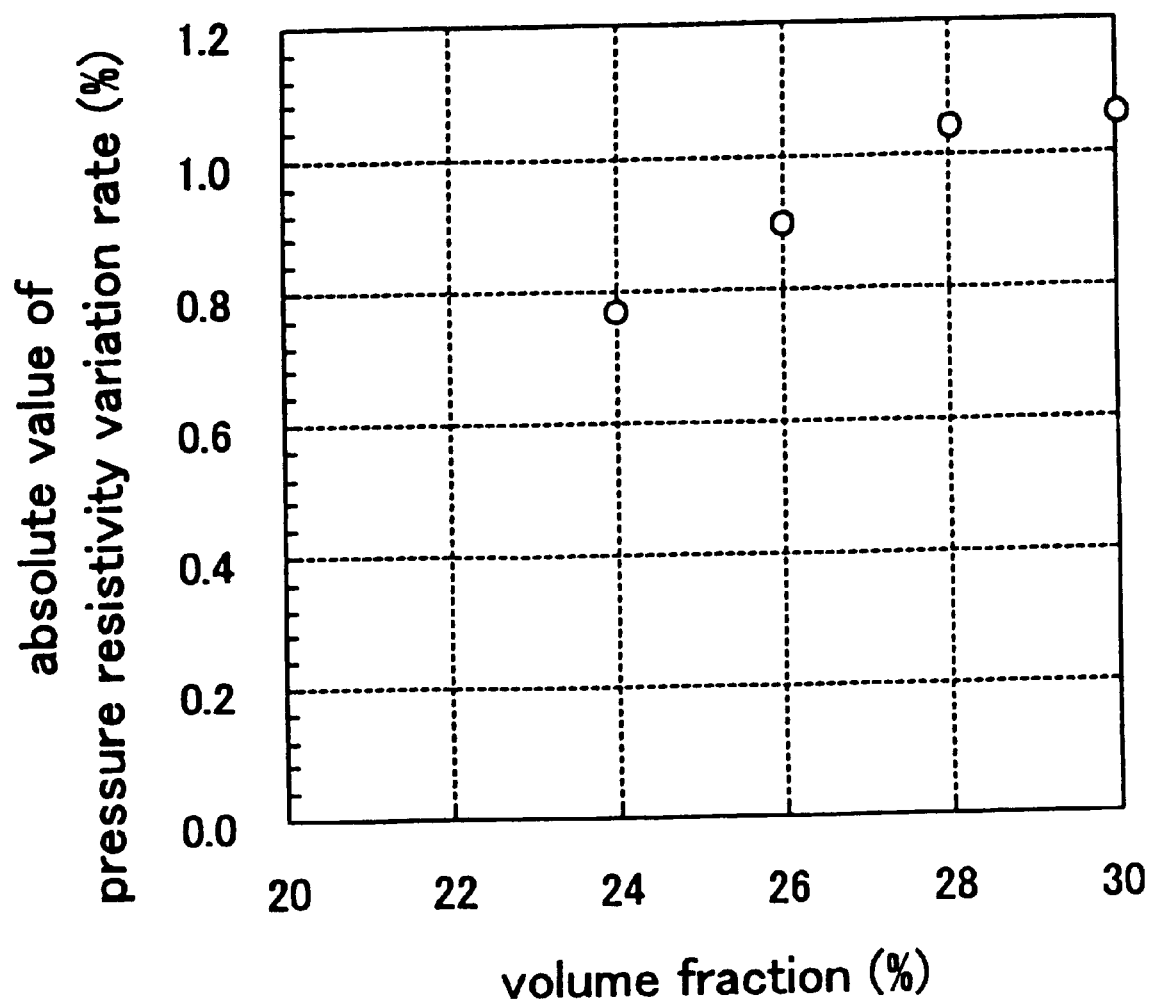
FIG. 7 is a diagram showing a relationship between a volume fraction of a piezoresistance material and an absolute value of a resistivity variation rate according to the second embodiment 2.

In the second embodiment, as shown in FIG. 6 and FIG. 7, some sensor materials with their different volume fraction of piezoresistance materials were provided, and the resistivity and resistivity variation rate were measured for each of the materials.

As a piezoresistance material, same as in the first embodiment, there were used perovskite type complex oxide powders $La_{0.75}Sr_{0.25}MnO_3$. As a ceramic material, as in the first embodiment, $ZrO_2$ were used.

The volume fraction of $La_{0.75}Sr_{0.25}MnO_3$ relevant to a total weight was changed from 24% by weight to 30% by weight, and the respective resistivity and resistivity variation rate were described in FIG. 6.

A detailed description of a method for fabricating a sensor material and a detailed description of a method for measuring a resistivity variation rate will be identical to those according to the first embodiment.

As known from the figure, a larger additive amount of a piezoresistance material reduces a resistivity.

In addition, the resistivity variation rate under a compressive stress of 100 MPa is described in FIG. 7. In any additive amount, a resistivity variation rate of 0.7% or more (absolute value) is shown. It is found that any of the materials according to this embodiment can also be employed for a sensor.

(Third Embodiment)

Figure 8:
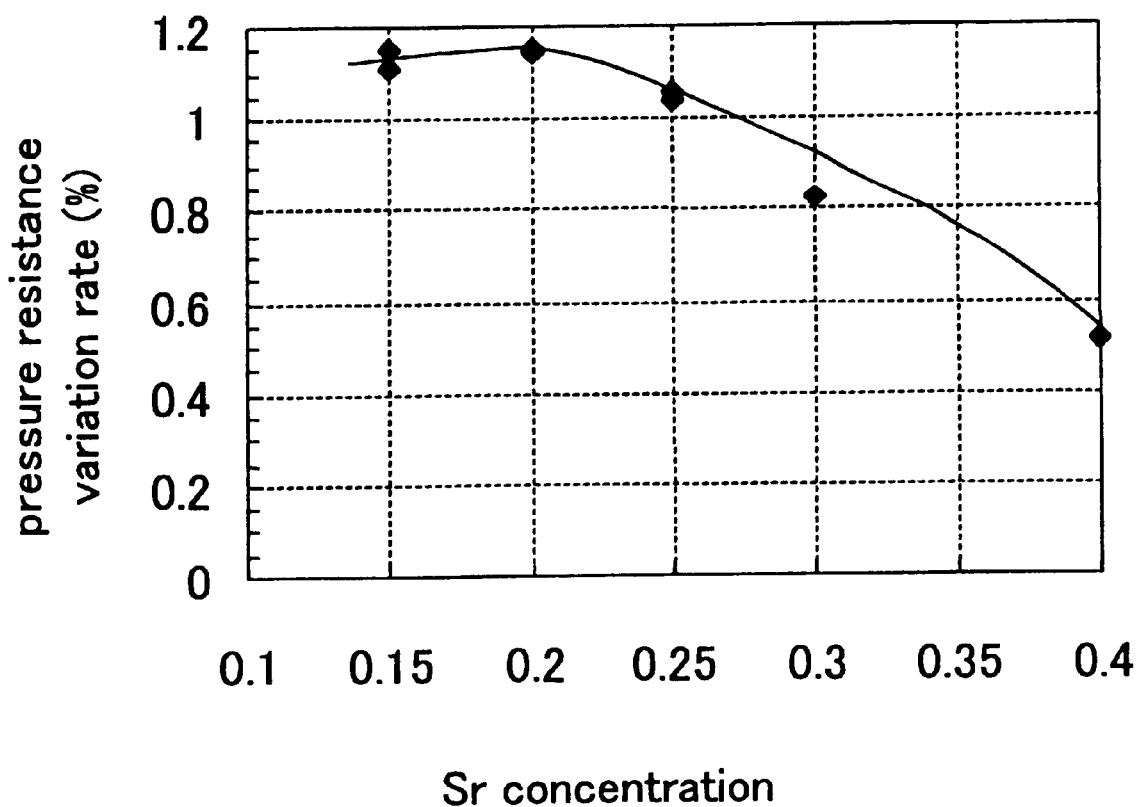
FIG. 8 is a diagram showing a relationship between a resistivity variation rate and an Sr concentration according to a third embodiment.

In the third embodiment, as shown in FIG. 8, perovskite type complex oxide powders $La_{1-x}Sr_xMnO_3$ are employed as a piezoresistance material, and the concentration "x" of Sr relevant to La is changed in the range from 0.15 to 0.40. The resistivity variation rate of each material is measured, and is described in FIG. 8.

The piezoresistance material according to the embodiment was made of the above mentioned $La_{1-x}Sr_xMnO_3$, and was fabricated in a manner similar to the first embodiment. In addition, a ceramic material was made of $ZrO_2$ in a manner similar to the first embodiment. Further, an additive amount of $La_{1-x}Sr_xMnO_3$ relevant to a total weight is 28% by weight.

A detailed description of a method for fabricating a sensor material and a detailed description of a method for measuring a resistivity variation rate are similar to those according to the first embodiment.

FIG. 8 describes a resistivity variation rate (absolute value) under a compressive stress of 100 MPa.

It was found that any material can be used as a sensor material when a concentration "x" of Sr is within the range from 0.15 to 0.40.

(Fourth Embodiment)

In the fourth embodiment, a sensor material was fabricated as a piezoresistance material by employing perovskite type complex oxide powders $La_{0.7}Sr_{0.2}MnO_3$.

A ceramic material was $ZrO_2$, which was similar to the first embodiment. In addition, an additive amount of $La_{0.7}Sr_{0.2}MnO_3$ relevant to a total weight was 28% by weight.

A detailed description of a method for fabricating a sensor material is similar to those according to the first embodiment.

The resistivity variation rate under a compressive stress of 100 MPa was −1.0% when the rate was measured in a method similar to that according to the first embodiment.

In this manner, it was found that the material according to the present invention can be used as a sensor material.

(Fifth Embodiment)

In the fifth embodiment, a sensor material was fabricated by employing perovskite type oxide powders $Pr_{0.8}Sr_{0.2}MnO_3$ as a piezoresistance material.

A ceramic material was $ZrO_2$, which was similar to the first embodiment. In addition, an additive amount of $Pr_{0.8}Sr_{0.2}MnO_3$ relevant to a total weight was 28% by weight.

A detailed description of a method for fabricating a sensor material is similar to that according to the first embodiment.

The resistivity variation rate under a compressive stress of 100 MPa was −1.0% when the rate was measured in a method similar to that according to the first embodiment.

In this manner, it was found that the material according to the embodiment can be used as a sensor material.

(Sixth Embodiment)

In the sixth embodiment, a sensor was fabricated by employing perovskite type complex oxide powders $Nd_{0.8}Sr_{0.2}MnO_3$ as a piezoresistance material.

A ceramic material was $ZrO_2$ in a manner similar to the first embodiment. In addition, an additive amount of $Nd_{0.8}Sr_{0.2}MnO_3$ was 28% by weight relevant to a total weight.

A detailed description of a method for fabricating a sensor material is similar to that according to the first embodiment.

The resistivity variation rate under a compressive stress of 100 MPa was −1.1% when the rate was measured in a method similar to that according to the first embodiment.

In this manner, it was found the material according to the embodiment can be used as a sensor material.

(Seventh Embodiment)

In the seventh embodiment, a sensor material was fabricated by employing perovskite type complex oxide powders $Sm_{0.8}Sr_{0.2}MnO_3$ as a piezoresistance material.

A ceramic material was $ZrO_2$, which was similar to the first embodiment. In addition, an additive amount of $Sm_{0.8}Sr_{0.2}MnO_3$ relevant to a total weight was 28% by weight.

A detailed description of a method for fabricating a sensor material was similar to that according to the first embodiment.

The resistivity variation rate under a compressive stress of 100 MPa was −1.0% when the rate was measured in a method similar to the first embodiment.

In this manner, it was found that the material according to the embodiment can be used as a sensor material.

(Eighth Embodiment)

In the eighth embodiment, a sensor material was fabricated by employing perovskite type complex oxide powders $Gd_{0.8}Sr_{0.2}MnO_3$ as a piezoresistance material.

A ceramic material was $ZrO_2$, which was similar to the first embodiment. In addition, an additive amount of $Gd_{0.8}Sr_{0.2}MnO_3$ relevant to a total weight was 28% by weight.

A detailed description of a method for fabricating a sensor material was similar to the first embodiment.

The resistivity variation rate under a compressive stress of 100 MPa was −1.1% when the rate was measured in a method similar to the first embodiment.

In this manner, it was found that the material according to the embodiment can be used as a sensor material.

(Ninth Embodiment)

In the ninth embodiment, a sensor material was fabricated by employing perovskite type complex oxide powders $La_{1.6}Sr_{0.4}Mn_2O_7$ as a piezoresistance material.

A ceramic material was $ZrO_2$, which was similar to the first embodiment. In addition, an additive amount of $La_{1.6}Sr_{0.4}Mn_2O_7$ relevant to a total weight was 28% by weight.

A detailed description of a method for fabricating a sensor material was similar to the first embodiment.

The resistivity variation rate under a compressive stress of 100 MPa was −0.9% when the rate was measured in a method similar to the first embodiment.

In this manner, it was found that the material according to the embodiment can be used as a sensor material.

(Tenth Embodiment)

In the embodiment, a sensor material was fabricated by employing a semiconductor "Si" as a piezoresistance material.

A ceramic material was a silicon nitride. An additive amount of Si relevant to a total weight was 30% by weight.

These materials was sintered at 1600° C. by employing a hot press after wet type mixture.

The resistivity variation rate under a compressive stress of 100 MPa was −0.5% when the rate was measured in a method similar to that according to the first embodiment 1.

In this manner, it was found that the material according to the embodiment can be used as a sensor material.

As described above, according to the present invention, there can be provided a sensor material capable of configuring a sensor capable of measuring directly a high value of physical parameters such as high stress or high pressure and the like without employing a pressure resistance container.

Obviously, numerous modifications and variations of the present invention are possible in light of the above teachings. It is therefore to be understood that, within the scope of the appended claims, the invention may be practiced otherwise than as specifically described here.

What is claimed is:

1. A sensor material for measuring static and dynamic physical parameters, comprising:
   a matrix made of an electrically insulating ceramic material; and
   piezoresistance materials which are dispersed in said matrix so as to be electrically continuous to each other, wherein said piezoresistance material is made of at least one member selected from the group consisting of $(Ln_{1-x}M_x)_{1-y}MbO_{3-z}$ with a perovskite structure (where, $0<x\leq0.5$, $0\leq y\leq0.2$, $0\leq z\leq0.6$, Ln: rare earth element, Ma: at least one alkaline earth element, Mb: at least one transition-metal element) and $(Ln_{2-u}Ma_{1+u})_{1-v}Mb_2O_{7-w}$ with a layered perovskite structure (where, $0<x\leq1.0$, $0\leq v\leq0.2$, $0\leq w\leq1.0$, Ln: rare earth element, Ma: at least one alkaline earth element, Mb: at least one transition-metal element).

2. A sensor material according to claim 1, wherein said piezoresistance material has a piezoresistance at a certain temperature within the temperature range of at least −50 to 200° C.

3. A sensor material according to claim 1, wherein the pressure resistivity variation rate of said piezoresistance-material is 0.001%/MPa or more.

4. A sensor material according to claim 1, wherein the relative density of said sensor material is 90% or more.

5. A sensor material according to claim 1, wherein the resistivity of said sensor material is 0.1 Ωcm to 10 kΩcm.

6. A sensor material according to claim 1, wherein the bending strength of said electrically insulating ceramic material is 200 MPa or more.

7. A sensor material according to claim 1, wherein said electrically insulating ceramic material is made of at least one member selected from the group consisting of $ZrO_2$, $Al_2O_3$, $MgAl_2O_4$, $SiO_2$, $3Al_2O_3 \cdot 2SiO_2$, $Y_2O_3$, $CeO_2$, $La_2O_3$, $Si_3N_4$ and solid solution thereof.

8. A sensor material according to claim 1, wherein an amount of said piezoresistance material is 5 to 95% by weight relative to a total amount of a sensor material.

9. A sensor material according to claim 1, wherein said electrically insulating ceramic material is $ZrO_2$ or $ZrO_2$ with $CeO_2$, $Y_2O_3$, CaO, or MgO added thereto, and said piezoresistance material is composed of $Ln_{1-x}Ma_xMbO_{3-z}$ with a perovskite structure (where, $0<x\leq0.5$, $0\leq z\leq0.6$, Ln: rare earth element, Ma: at least one alkaline earth element, Mb: at least one transition-metal element).

10. A sensor material according to claim 1, wherein said electrically insulating ceramic material is $ZrO_2$ or $ZrO_2$ with $CeO_2$, $Y_2O_3$, CaO, or MgO added thereto, and said piezoresistance material is made of $(Ln_{1-x}Ma_x)_{1-y}MbO_{3-z}$ with a perovskite structure (where, $0<x\leq0.5$, $0\leq y\leq0.2$, $0\leq z\leq0.6$, Ln: rare earth element, Ma: at least one alkaline earth element, Mb: at least one transition-metal element).

11. A sensor material according to claim 1, wherein said electrically insulating ceramic material is made of $Al_2O_3$, and said piezoresistance material is made of $(Ln_{1-x}Ma_x)_{1-y}MbO_{3-z}$ with a perovskite structure (where, $0<x\leq0.5$, $0\leq y\leq0.2$, $0\leq x\leq0.6$, Ln: rare earth element, Ma: at least one alkaline earth elements, Mb: at least one transition-metal element).

12. A sensor material for measuring static and dynamic physical parameters, comprising:
   a matrix made of an electrically insulating ceramic material; and
   piezoresistance materials which are dispersed in said matrix so as to be electrically continuous to each other, wherein the relative density of said sensor material is 90% or more.

13. A sensor material according to claim 12, wherein said piezoresistance material has a piezoresistance at a certain temperature within the temperature range of at least −50 to 200° C.

14. A sensor material according to claim 12, wherein the pressure resistivity variation rate of said piezoresistance material is 0.001%/MPa or more.

15. A sensor material according to claim 12, wherein the resistivity of said sensor material is 0.1 Ωcm to 10 kΩcm.

16. A sensor material according to claim 12, wherein the bending strength of said electrically insulating ceramic material is 200 MPa or more.

17. A sensor material according to claim 12, wherein said piezoresistance material is made of at least one member selected from the group consisting of $(Ln_{1-x}Ma_x)_{1-y}MbO_{3-z}$ with a perovskite structure (where, $0<x\leq0.5$, $0\leq y\leq0.2$, $0\leq z\leq0.6$, Ln: rare earth element, Mb: at least one transition-metal element), $(Ln_{2-u}Ma_{1+u})_{1-v}Mb_2O_{7-w}$ with a layered perovskite structure (where, $0<u\leq1.0$, $0\leq v\leq0.2$, $0\leq w\leq1.0$, Ln: rare earth element, Ma: at least one alkaline earth element, Mb: at least one transition-metal element) and Si.

18. A sensor material according to claim 12, wherein said electrically insulating ceramic material is made of at least one member selected from the group consisting of $ZrO_2$, $Al_2O_3$, $MgAl_2O_4$, $SiO_2$, $3Al_2O_3 \cdot 2SiO_2$, $Y_2O_3$, $CeO_2$, $La_2O_3$, $Si_3N_4$ and solid solution thereof.

19. A sensor material according to claim 12, wherein an amount of said piezoresistance material is 5 to 95% by weight relative to a total amount of a sensor material.

20. A sensor material according to claim 12, wherein said electrically insulating ceramic material is $ZrO_2$ or $ZrO_2$ with $CeO_2$, $Y_2O_3$, CaO, or MgO added thereto, and said piezoresistance material is composed of $Ln_{1-x}Ma_xMbO_{3-z}$ with a perovskite structure (where, $0<x\leq0.5$, $0\leq z\leq0.6$, Ln: rare earth element, Ma: at least one alkaline earth element, Mb: at least one transition-metal element).

21. A sensor material according to claim 12, wherein said electrically insulating ceramic material is $ZrO_2$ or $ZrO_2$ with $CeO_2$, $Y_2O_3$, CaO, or MgO added thereto, and said piezoresistance material is made of $(Ln_{1-x}Ma_x)_{1-y}MbO_{3-z}$ with a perovskite structure (where, $0<x\leq0.5$, $0\leq y\leq0.2$, $0\leq z\leq0.6$, Ln: rare earth element, Ma: at least one alkaline earth element, Mb: at least one transition-metal element).

22. A sensor material according to claim 12, wherein said electronically insulating ceramic material is made of $Si_3N_4$, and said piezoresistance material is made of Si.

23. A sensor material according to claim 12, wherein said electrically insulating ceramic material is made of $Al_2O_3$, and said piezoresistance material is made of $(Ln_{1-x}Ma_x)_{1-y}MbO_{3-z}$ with a perovskite structure (where, $0<x\leq0.5$, $0\leq y\leq0.2$, $0\leq x\leq0.6$, Ln: rare earth element, Ma: at least one alkaline earth elements, Mb: at least one transition-metal element).

* * * * *

UNITED STATES PATENT AND TRADEMARK OFFICE
CERTIFICATE OF CORRECTION

PATENT NO.    : 6,534,430 B2
DATED         : March 18, 2003
INVENTOR(S)   : Hiroaki Makino et al.

It is certified that error appears in the above-identified patent and that said Letters Patent is hereby corrected as shown below:

Column 11,
Line 22, "$(Ln_{1-x}M_x.)_{1-y}MbO_{3-z}$" should read -- $(Ln_{1-x}Ma_x.)_{1-y}MbO_{3-z}$ --.

Column 12,
Lines 4 and 64, "elements," should read -- element, --.

Signed and Sealed this

Ninth Day of September, 2003

JAMES E. ROGAN
*Director of the United States Patent and Trademark Office*